(12) United States Patent
Hoshika et al.

(10) Patent No.: US 7,971,479 B2
(45) Date of Patent: Jul. 5, 2011

(54) FLUID FLOW RATE MEASUREMENT APPARATUS

(75) Inventors: Hiroaki Hoshika, Hitachiohmiya (JP); Noboru Tokuyasu, Hitachinaka (JP); Takanori Kokubu, Hitachinaka (JP); Kaori Kashio, Sakura (JP)

(73) Assignee: Hitachi, Ltd., Tokyo (JP)

( * ) Notice: Subject to any disclaimer, the term of this patent is extended or adjusted under 35 U.S.C. 154(b) by 51 days.

(21) Appl. No.: 12/333,879

(22) Filed: Dec. 12, 2008

(65) Prior Publication Data

US 2009/0151445 A1    Jun. 18, 2009

(30) Foreign Application Priority Data

Dec. 14, 2007    (JP) ................................. 2007-323292

(51) Int. Cl.
*G01F 1/68* (2006.01)
(52) U.S. Cl. .................... 73/202.5; 73/204.23
(58) Field of Classification Search .................. None
See application file for complete search history.

(56) References Cited

U.S. PATENT DOCUMENTS

| | | | |
|---|---|---|---|
| 4,596,138 A | | 6/1986 | Ito et al. |
| 4,833,912 A | | 5/1989 | Ohta et al. |
| 4,914,742 A | * | 4/1990 | Higashi et al. ................ 428/620 |
| 5,789,673 A | * | 8/1998 | Igarashi et al. ............... 73/202.5 |
| 5,892,146 A | * | 4/1999 | Kobayashi et al. ........ 73/114.34 |
| 6,889,545 B2 | * | 5/2005 | Nakada et al. ............. 73/204.26 |
| 2004/0163464 A1 | * | 8/2004 | Nakada et al. ............. 73/204.26 |
| 2007/0137298 A1 | * | 6/2007 | Konzelmann et al. ..... 73/204.26 |
| 2007/0261473 A1 | * | 11/2007 | Weyl et al. .................... 73/23.31 |
| 2008/0223110 A1 | * | 9/2008 | Weyl et al. .................... 73/31.05 |

FOREIGN PATENT DOCUMENTS

| | | |
|---|---|---|
| DE | 10 2005 061 533 A1 | 7/2007 |
| JP | 63-6421 A | 1/1988 |
| JP | 3-63823 U | 6/1991 |
| JP | 9-287992 A | 11/1997 |
| JP | 10-281838 A | 10/1998 |
| JP | 10-281839 A | 10/1998 |

OTHER PUBLICATIONS

European Search Report dated May 20, 2009 (five (5) pages).
English translation of Chinese Office Action dated Apr. 27, 2010 (Three (3) pages).

* cited by examiner

*Primary Examiner* — Harshad Patel
(74) *Attorney, Agent, or Firm* — Crowell & Moring LLP

(57) ABSTRACT

A fluid flow rate measurement apparatus prevents accumulation of pollutional substances in a sub-passage to enable high-accuracy fluid flow rate measurement. A heater pattern is formed on the surface of a cylindrical rod. When electricity is conducted in the heater pattern and heat is generated, the heat is transmitted to the sub-passage through an insulating layer. The heat is gradually transmitted up to the leading end of the sub-passage, and burns out pollutional substances adhering to the sub-passage. In this way, accumulation in the sub-passage of pollutional substances can be prevented, thus attaining a fluid flow rate measurement apparatus that enables high-accuracy fluid flow rate measurement.

3 Claims, 12 Drawing Sheets

BRANCH RATIO $q_1/Q_1$ < BRANCH RATIO $q_2/Q_2$

FLUID FLOW RATE MEASUREMENT APPARATUS

BACKGROUND OF THE INVENTION

1. Field of the Invention

The present invention relates to a fluid flow rate measurement apparatus which measures the flow velocity of fluid to measure the flow rate of the fluid.

2. Description of the Related Art

Various methods and apparatuses for measuring the flow rate of air and other gases have been developed and put to practical use. With some fluid flow rate measurement apparatuses, a flow velocity or flow rate detecting element is directly disposed in a fluid flow; with other fluid flow rate measurement apparatuses, a sub-passage in which fluid flows in a branching manner is provided and the fluid flowing in the sub-passage is measured, whereby requirements for flowmeters are improved.

The flowmeter having the sub-passage has been used in diverse fields because of its superiority in measurement accuracy, measurement range, stability to pulsating flow, adjustment of backward flow sensitivity, stability of flow rate output signal, and robustness and easy handling of a detecting element.

However, if a pollutional substance exists in fluid, the pollutional substance may accumulate on a flow rate detecting element of the flowmeter. If the pollutional substance accumulates on the flow rate detecting element, characteristics of heat exchange and heat transfer between the detecting element and the fluid may be changed, and thereby characteristic change of the flowmeter will be liable to occur.

In view of the above-mentioned circumstances, JP-A-10-281838 and JP-A-10-281839 disclose a method for removing pollutional substances by subjecting a detecting element to heating at a high temperature using dedicated heating means. Further, JP-U-3-063823 discloses a method for removing pollutional substances that adheres to a detecting element by reflecting radiant heat of the detecting element using a reflector disposed in the vicinity of the detecting element.

SUMMARY OF THE INVENTION

If a fluid flow rate measurement apparatus is provided with a sub-passage, the sub-passage is also susceptible to adherence of pollutional substances. The pollutional substance accumulated on the inner surface of the sub-passage will change characteristics of heat exchange or heat transfer between the detecting element and the fluid, or change the cross-sectional profile and the cross-sectional area of the sub-passage, resulting in characteristic change of the flowmeter.

However, although the conventional techniques can remove pollutional substances accumulated on a detecting element, they give no consideration to pollutional substances accumulated in the sub-passage. For this reason, there has been a problem that pollutional substances adhere to and accumulate in the sub-passage resulting in degradation of the flow rate measurement accuracy of the fluid flow rate measurement apparatus.

An object of the present invention is to attain a fluid flow rate measurement apparatus that enables fluid flow rate measurement with high-accuracy by preventing pollutional substances from accumulating in the sub-passage.

In order to attain the above-mentioned object, the present invention is configured as follows:

The present invention provides a fluid flow rate measurement apparatus comprising: a main passage where fluid to be measured flows; a sub-passage disposed in the main passage, part of the fluid to be measured that flows in the main passage flowing into and flowing out of the sub-passage; a detecting element disposed in the sub-passage to detect the flow rate of the fluid to be measured; and means for heating a member that forms the sub-passage.

In accordance with the present invention, pollutional substances can be prevented from accumulating in the sub-passage, thus attaining a fluid flow rate measurement apparatus that enables high-accuracy fluid flow rate measurement.

DESCRIPTION OF THE PREFERRED EMBODIMENTS

Embodiments of the present invention will be explained below with reference to the accompanying drawings.

First Embodiment

Figure 1:
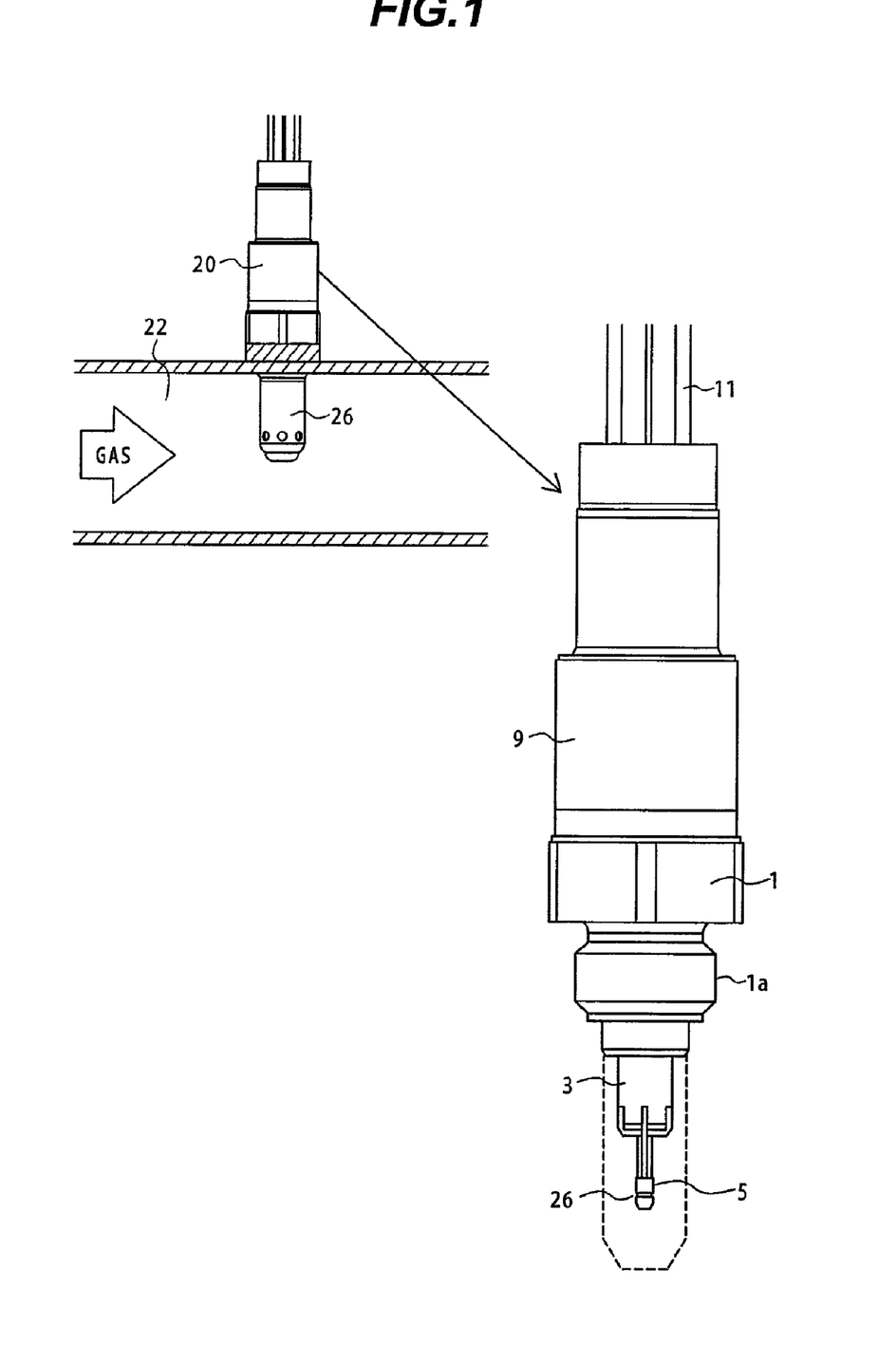
FIG. 1 is a schematic view showing the appearance of a fluid flow rate detection apparatus according to the present invention.

FIG. 1 is a schematic view showing the appearance of a fluid flow rate detection apparatus according to the present invention. FIG. 1 shows an example in the case where the present invention is applied to an apparatus for measuring the flow rate of air supplied to an internal combustion engine.

Referring to FIG. 1, a sensor probe 20 is inserted into a main passage 22, a sub-passage 26 is formed in the sensor probe 20, and a detecting element 5 is disposed inside the sub-passage 26. When fluid to be measured (a gas to be measured) flows in the main passage 22, most part of the fluid passes through the main passage 22 as it is, and part of the fluid to be measured flows into the sub-passage 26 from a fluid inlet formed in the sub-passage 26 provided in the sensor probe 20. Then, the fluid to be measured which has flowed into the sub-passage 26 passes through the detecting element 5, flows out of a fluid outlet formed in the sub-passage 26, and then joins the fluid in the main passage 22.

It should be noted that the sub-passage 26 is formed in various shapes based on characteristics of fluid to be measured. Shapes different from the shape applied in the example shown in FIG. 1 may be used.

Figure 2:
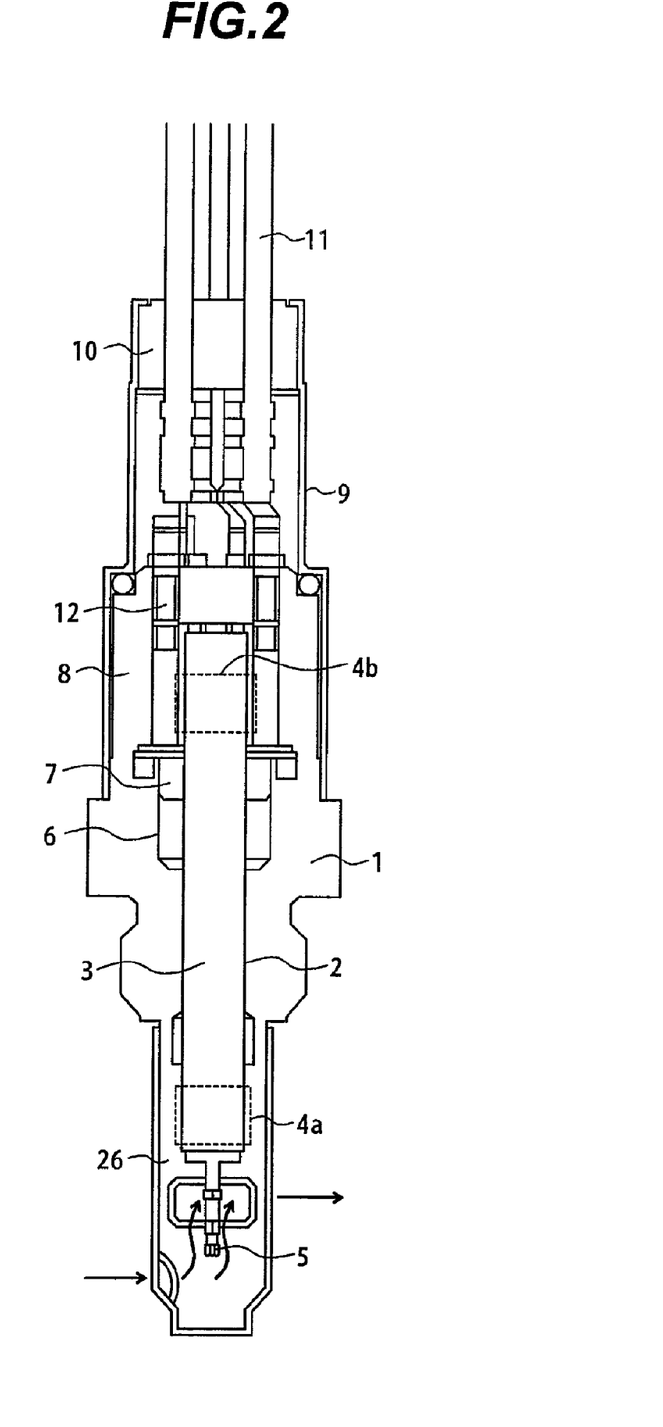
FIG. 2 is a cross-sectional view of a sensor probe according to the present invention.

FIG. 2 is a cross-sectional view of the sensor probe 20. Referring to FIG. 2, a holder 1 is formed with a cylindrical insertion hole 2, into which a cylindrical rod 3 is inserted. The cylindrical rod 3 extends through the insertion hole 2 and is exposed from both axial ends of the holder 1. Electrodes 4a and 4b are formed at the opposite ends of the cylindrical rod 3. The cylindrical rod 3 is made of preferably an insulator, for example, a ceramic such as alumina.

Figure 3:
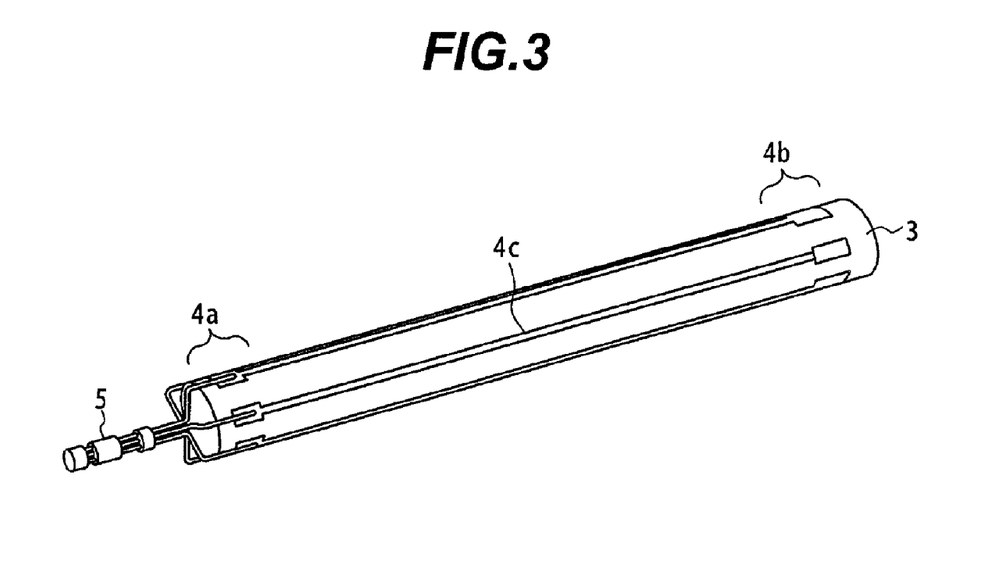
FIG. 3 is a diagram showing a state in which a cylindrical rod is assembled with a detecting element.

FIG. 3 shows a state in which the cylindrical rod 3 is assembled with the detecting element 5. Referring to FIG. 3, the detecting element 5 for gas flow rate measurement is disposed on the side of the electrodes 4a, and conductive connection is made between the detecting element 5 and the electrodes 4a. Further, the electrodes 4a and 4b are connected to each other through conductors 4c formed by printing.

Referring to FIG. 2, a radially-enlarged portion is formed on the side of the electrodes 4b of the hole 2, and a seal provided on the radially-enlarged portion maintains the airtightness of a gap between the hole 2 and the cylindrical rod 3. Specifically, ceramic powder (for example, non-sintered talc, etc.) 6 is applied to the radially-enlarged portion and then pushed in using a spacer (for example, a washer or the like) 7 to fill the gap.

Further, a terminal retaining glass 8 having a bottomed cylindrical shape is fixed on the side of the electrodes 4b of the holder 1, and the electrodes 4b of the cylindrical rod 3 are covered by the terminal retaining glass 8. Further, a cylindrical casing 9 is provided so as to cover the outer circumference of the terminal retaining glass 8 with a predetermined gap. The casing 9 is fixed to the outer circumference of the holder 1 through circumferential laser welding or the like to ensure the airtightness of the gap between the casing 9 and the holder 1.

Further, a cylindrical seal rubber 10 is internally provided at the end on the side opposite to the detecting element 5 of the casing 9. A plurality of lead wires 11 are lead out through the seal rubber 10. The seal rubber 10 is fixed to the casing 9 through press-fitting to ensure the airtightness between the seal rubber 10 and the lead wires 11 and between the seal rubber 10 and the casing 9. The seal rubber 10 is made of preferably a material having high heat-resistance, such as fluoride rubber.

A terminal 12 is connected to an end of each lead wire 11. The terminals 12 are retained by the terminal retaining glass 8. Each of the terminals 12 is composed of an elastic member. The elastic force allows the terminals 12 to be more securely in contact with the electrodes 4b formed on the surface of the cylindrical rod 3, ensuring more secure conduction at this portion. Therefore, the electrodes 4b are connected to the lead wires 11 through the terminals 12.

A sensing probe 20 is fixed to a pipe by screwing a screw 1a (shown in FIG. 1) of the holder 1 into a screw hole formed on the pipe in which a gas to be measured flows. At this time, the detecting element 5 is disposed in such a manner that it is protruded from the inner surface of the pipe. The gap between the sensing probe 20 and the pipe is sealed by a gasket.

With the above-mentioned structure, the flow velocity or flow rate can be detected through measurement of heat exchange generated between the gas passing through the sub-passage 26 and the detecting element 5.

Since the gas to be measured passing through the sub-passage 26 is only part of the gas flowing in the main passage 22, it is necessary to know the ratio of the gas flow rate in the sub-passage 26 to that in the main passage 22. This ratio of the two gas flow rates is referred to as branch ratio (q/Q), which will be explained with reference to FIG. 10.

Figure 10:
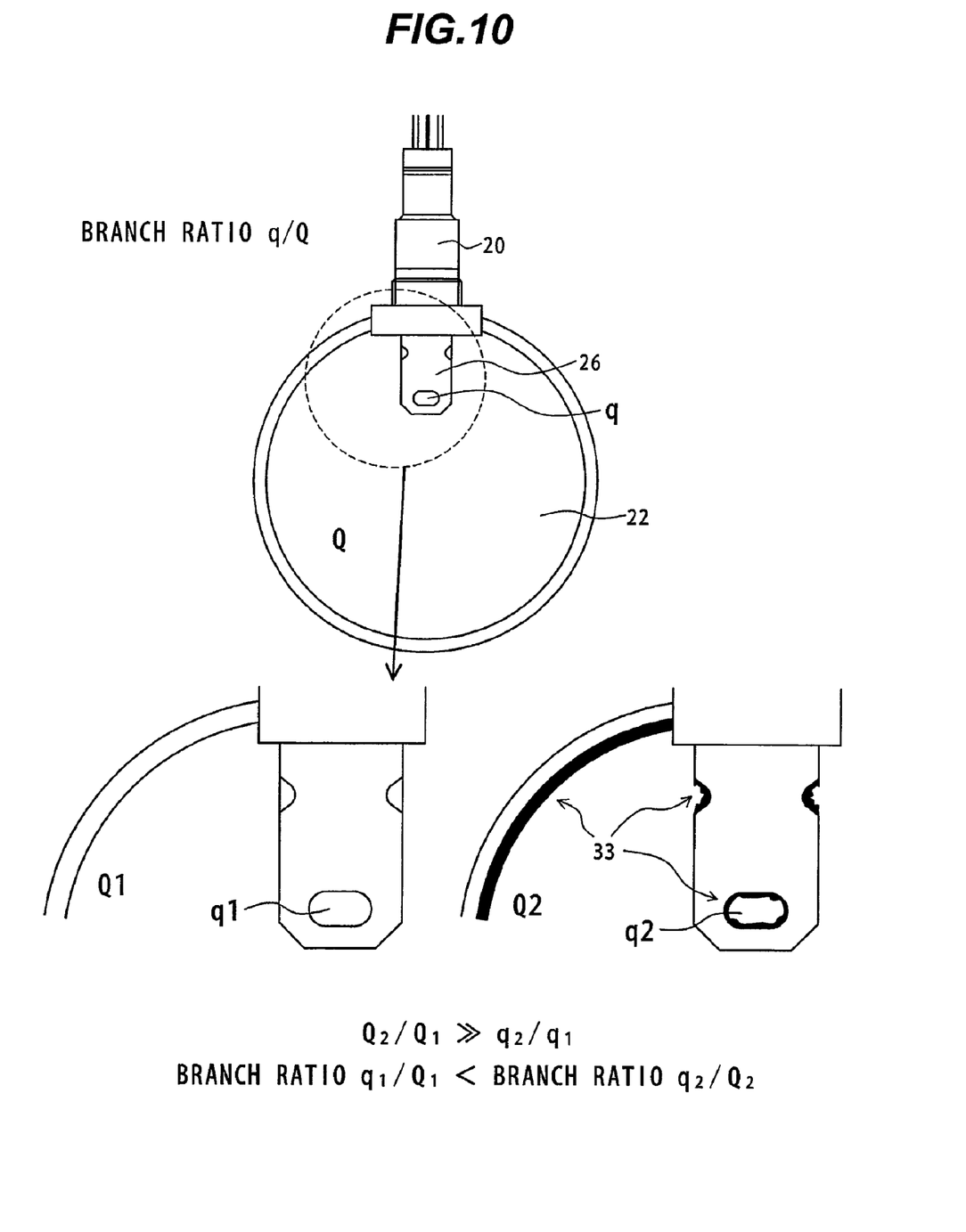
FIG. 10 is a diagram showing the branch ratio.

Symbol q denotes a fluid flow rate in the sub-passage 26, and symbol Q a fluid flow rate in the main passage 22.

The principle of flow rate measurement with the fluid flow rate measurement apparatus will be briefly explained below.

Figure 8:
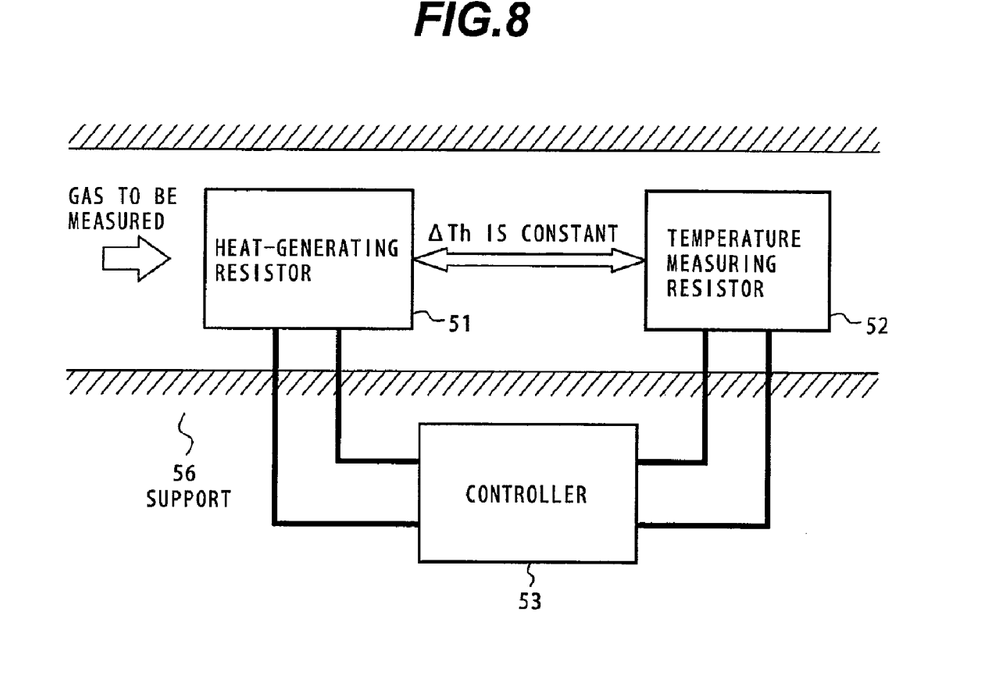
FIG. 8 is a schematic block diagram of a thermal gas flowmeter.

FIG. 8 is a schematic block diagram of a thermal gas flowmeter. To execute a thermal measurement method, at least two resistors are disposed in the gas to be measured; one resistor is used as a temperature measuring resistor 52 for gas temperature detection and the other as a heat-generating resistor 51 for flow rate detection.

The temperature difference (Th) between the heat-generating resistor 51 and the temperature measuring resistor 52 is always maintained constant by a control circuit in a controller 53 to attain measurement of the mass flow rate of gas. Although the above-mentioned temperature measuring resistor is shown only in FIGS. 8 and 9, the temperature measuring resistor is disposed in the main passage in the vicinity of the detecting element, in the sub-passage, or in the vicinity of the sub-passage.

Figure 9:
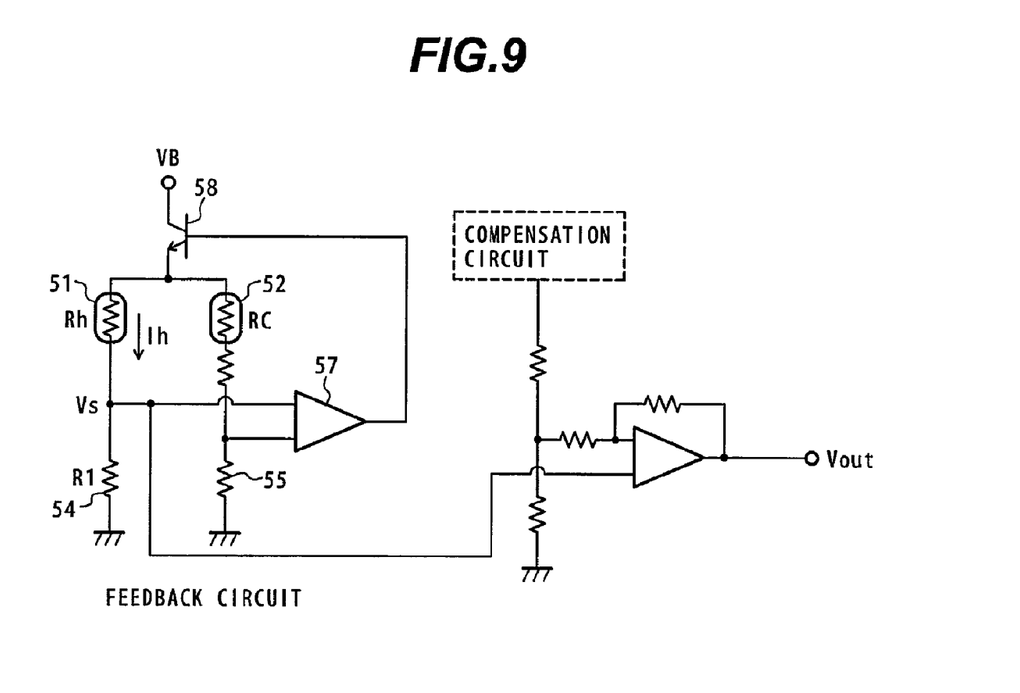
FIG. 9 shows the configuration of a control circuit.

FIG. 9 shows the configuration of the control circuit in the controller 53. Referring to FIG. 9, the heat-generating resistor 51 and the temperature measuring resistor 52 are disposed as bridge circuit resistors together with resistors 54 and 55. In the bridge circuit, the point at which the heat-generating resistor 51 and the resistor 54 are connected to each other and the point at which the temperature measuring resistor 52 and the resistor 55 are connected to each other are connected to the input terminals of a differential amplifier 57, and a signal output from the differential amplifier 57 is supplied to the base of a transistor 58. The emitter of the transistor 58 is connected to the bridge circuit.

Assuming that the heat-generating resistor 51 has a resistance Ih and a current Ih flows in the heat-generating resistor 51, a relation between the total heat release value Ph of the heat-generating resistor 51, the mass flow rate Q of the gas flowing in the heat-generating resistor 51, and the temperature difference Th of the gas is represented by the following Formula (1).

$$Ph = Ih^2 \cdot Rh = (A + B(Q)^{1/2}) \cdot Th \tag{1}$$

where A denotes heat conduction (heat leak) from the heat-generating resistor 51 to a support 56, and B heat transfer taken by the gas. A and B are handled as thermal constants.

Based on the Formula (1), a voltage Vs at the middle point between the heat-generating resistor 51 and the fixed resistor 54 is represented by the following Formula (2), which indicates that the voltage Vs depends on the mass flow rate Q of the gas. The voltage Vs is amplified and then output as a sensor output Vout (analog voltage value).

$$Vs = R1 \cdot Ih = R1 \cdot ((1/Rh) \cdot (A + B \cdot (Q)^{1/2}) \cdot Th)^{1/2} \tag{2}$$

The above characteristics are stably established only when a fixed branch ratio (ratio of the flow rate in the sub-passage to that in the main passage) is applied.

However, as shown in FIG. 10, if a pollutional substance 33 adheres to the inlet or outlet of the sub-passage 26 or the inner surface of the main passage 22, the branch ratio in the sub-passage 26 and main passage 22 changes. In this case, therefore, the total flow rate including the flow rate in the main passage 22 becomes different even with the same detection flow rate of the detecting element 5. In other words, the characteristics of the flowmeter will be changed.

In this case, contamination in the sub-passage 26 is particularly serious. The cross-sectional area of the sub-passage 26 is smaller than that of the main passage 22. Therefore, if the pollutional substance 33 accumulates on the sub-passage 26 by the same thickness as when it accumulates on the main passage 22, the change rate of the cross-sectional area of the sub-passage 26 is larger than that of the main passage 22, resulting in a large change of the branch ratio.

Figure 11:
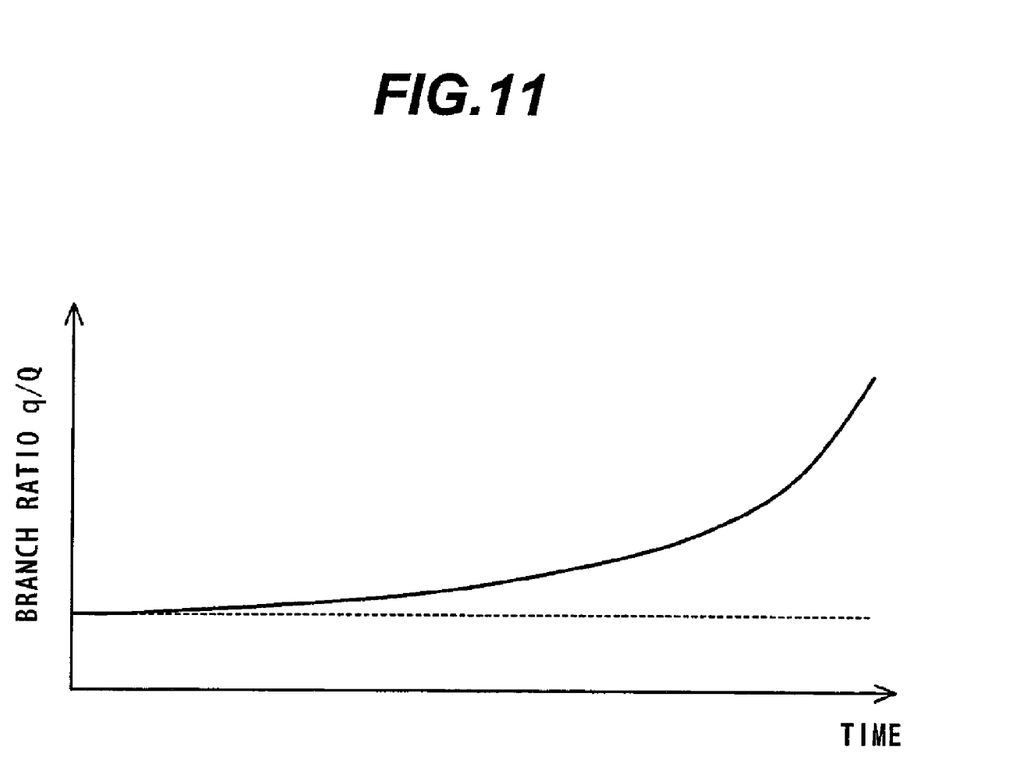
FIG. 11 is a graph for assistance in explaining aging for the branch ratio.

The branch ratio cumulatively changes depending on the operating time of the fluid flow rate measurement apparatus as shown in FIG. 11. With the flowmeter having a sub-passage, therefore, branch ratio variation caused by contamination produces a fatal characteristic error as the operating time progresses.

Pollutional substances will be explained below.

For example, in the exhaust environment of an internal combustion engine, nonvolatile components contained in particle materials (PM) such as dry soot and ash discharged from the internal combustion engine cause contamination. The dry soot is generated by insufficient mixture of the air suctioned into the combustion chamber of the internal combustion engine and the fuel injected into the chamber, that is, insufficient oxidization.

Contamination is caused by the adhesive force of volatile components such as SOF (soluble organic component) and HC (hydrocarbon) contained in particle materials (PM). The inclusion of these volatile components is based on the combustion of the internal combustion engine.

It has been clear that contamination on the surface of the detecting element 5 can be avoided by subjecting the detecting element 5 to heating at a high temperature (for example, 400° C. or higher). However, dry soot which is a main component of pollutional substances is neither oxidized and nor burned out at 600° C. or less. Although it is possible to take measures for contamination of the detecting element 5 by heating the detecting element 5 itself, removing pollutional substances accumulated in the sub-passage is necessary to maintain the performance and function of the flowmeter. Therefore, a structure that can remove pollutional substances by raising the temperature of the sub-passage 26 is essential.

An essential part of the first embodiment of the present invention will be explained below with reference to FIGS. 4 to 7. The present invention makes it possible to remove the pollutional substance 33 adhering to the sub-passage 26 to maintain the function and characteristics of the flowmeter over a long period of time.

First, the configuration of a heat source used to raise the temperature of the sub-passage 26 will be explained below with reference to FIGS. 4 to 6.

Figure 4:
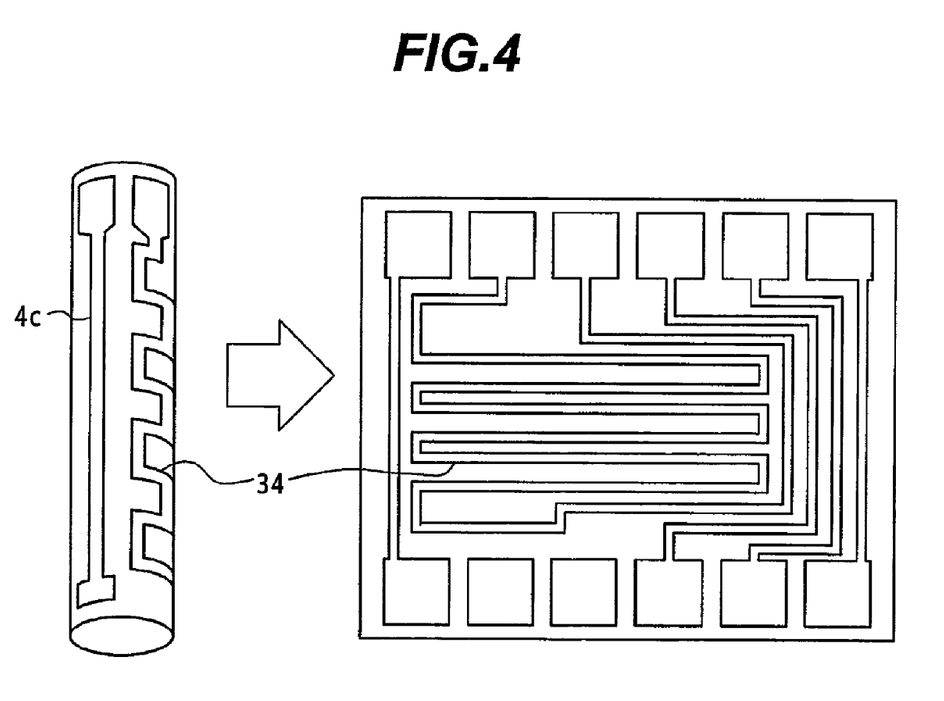
FIG. 4 is a diagram showing an example of printed patterns on the rod according to a first embodiment of the present invention.

FIG. 4 shows printed patterns on the surface of the cylindrical rod 3, the printed patterns being conductors formed by printing technique. Referring to FIG. 4, the electric connection to the detecting element 5 and a heater pattern 34 for heating the cylindrical rod 3 itself are printed on the cylindrical rod 3. The heater pattern 34 has an electric resistance that can generate Joule's heat by conduction.

In order to heat the sub-passage 26, electricity is conducted in the heater pattern 34 through the lead wires 11, the terminals 12, and the electrodes 4b to generate Joule's heat on the surface of the cylindrical rod 3. The heat generated on the surface of the cylindrical rod 3 heats the inner surface of the sub-passage 26, and the pollutional substances adhering to the inner surface of the sub-passage 26 are oxidized and burned out.

Figure 5:
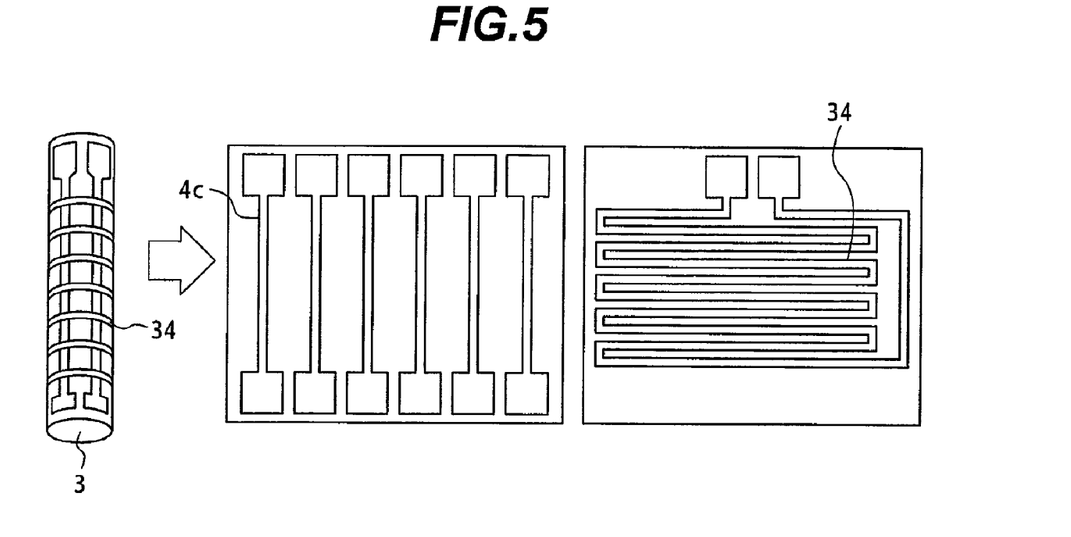
FIG. 5 is a diagram showing another example of printed patterns on the rod according to the first embodiment of the present invention.

FIG. 5 shows another example of the heater pattern 34. With the example shown in FIG. 5, the heater pattern 34 for heating the cylindrical rod 3 and the conductors 4c connected to the detecting element 5 are separately formed.

Since the heater pattern 34 shown in FIG. 5 can effectively use the limited surface area of the rod, a degree of freedom in arranging the heater pattern 34 or selecting the pattern resistance value can be increased.

Figure 6:
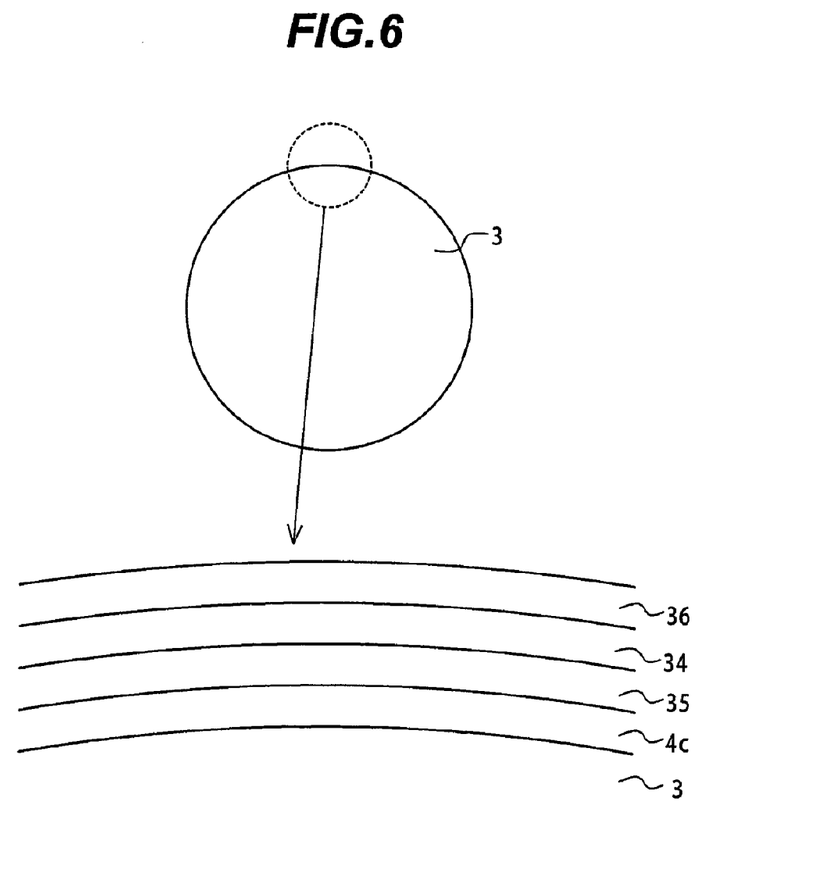
FIG. 6 is a partial schematic cross-sectional view of a cylindrical rod shown in the example of FIG. 5.

FIG. 6 is a partial schematic sectional view of the cylindrical rod 3 in the example of FIG. 5. Referring to FIG. 6, a conductor 4c for connection to the detecting element is printed on the cylindrical rod 3, and then an insulating layer 35 for electrically insulating the conductor 4c from other conductors is printed thereon. A heater pattern 34 is printed on the insulating layer 35. Further, another insulating layer 36 is printed on the heater pattern 34 to electrically insulate the rod surface from the heater pattern 34. The use of this method makes it possible to heat the sub-passage 26 to remove pollutional substances without using any special additional part or structure, thereby preventing price increase of the flowmeter and degradation of reliability thereof.

Figure 7:
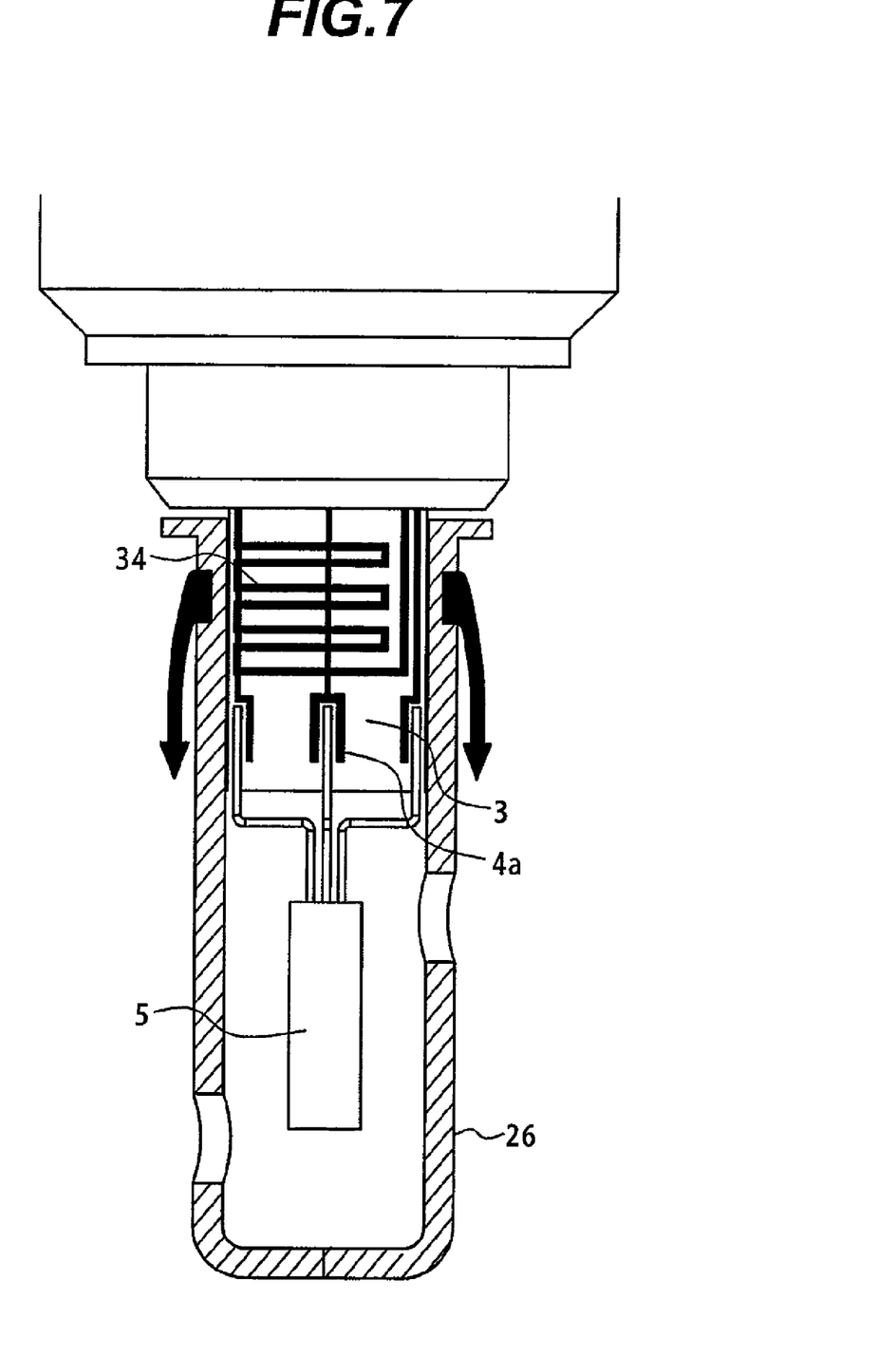
FIG. 7 is a diagram showing transfer of heat generated by a heater pattern to a sub-passage according to the first embodiment of the present invention.

The following explains the transfer of heat generated by the heater pattern 34 formed on the cylindrical rod 3 to the sub-passage 26 with reference to FIG. 7. Referring to FIG. 7, the cylindrical rod 3 is inserted into the sub-passage 26 so as to be fixed. The heat generated by the heater pattern 34 disposed on the surface of the cylindrical rod 13 is transmitted to the sub-passage 26 through the insulating layer 36 (FIG. 6).

This heat is gradually transmitted to the leading end of the sub-passage 26 so as to burn out pollutional substances adhering to the sub-passage 26.

The sub-passage 26 is made of preferably metals or ceramic such as alumina, but not limited thereto. Further, it is also possible to sandwich a material for assisting mechanical buffering and heat transfer (material having a heat transfer coefficient higher than that of the sub-passage 26 and the heater pattern 34 which is heating means) between the sub-passage 26 and the insulating layer 36 which serves as the surface of the cylindrical rod 3. Further, it is also possible to provide heating means for heating the detecting element 5 (for example, means for supplying a current larger than normal in the detecting element 5 to generate heat) so as to heat the detecting element 5 to high temperature during heating of the sub-passage 26. With the above-mentioned configuration, pollutional substances adhering to the detecting element 5 can be removed and further pollutional substances adhering to the sub-passage 26 can be removed more efficiently.

As mentioned above, the first embodiment of the present invention is configured such that the heater pattern 34 is formed on the surface of the cylindrical rod 3, and electricity is conducted in the heater pattern 34 to heat the member that is used to form the sub-passage 26, thus removing substances adhering to the sub-passage 26.

In this way, the present embodiment can prevent pollutional substances from accumulating in the sub-passage 26 to attain a fluid flow rate measurement apparatus that enables high-accuracy fluid flow rate measurement.

Second Embodiment

A second embodiment of the present invention will be explained below.

Figure 12:
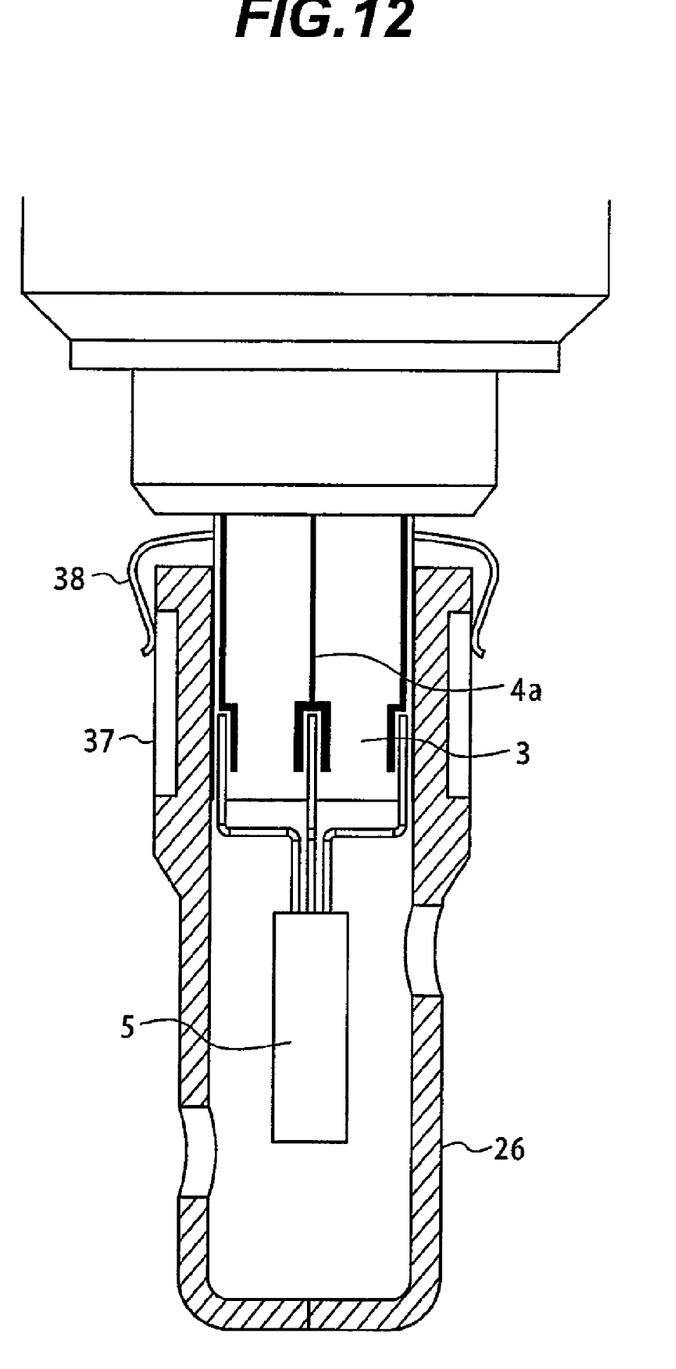
FIG. 12 is a diagram for assistance in explaining a second embodiment of the present invention.

FIG. 12 is a diagram for assistance in explaining the second embodiment of the present invention. The heater pattern 34 is formed on the surface of the cylindrical rod 3 in the first embodiment. In the second embodiment, the heater pattern 34 is not formed on the surface of the cylindrical rod 3; instead, a heater 37 is disposed in the sub-passage 26 as shown in FIG. 12. Other elements are the same as those of the first embodiment and therefore illustrations and detailed explanations are omitted.

The heater 37 is supplied with power from the cylindrical rod 3, for example, through power lead wires 38 to heat the sub-passage 26. The power lead wires 38 are connected to the electrode 4b formed on the cylindrical rod 3.

The heater 37 can be configured in such a manner that the same pattern as the heater pattern 34 in the first embodiment is disposed or printed on the inner or outer surface of the sub-passage 26. Further, the same result can be obtained even by supplying power to the heater 37 not only from the cylindrical rod 3 but also from other portions.

As mentioned above, the second embodiment of the present invention is configured such that the heater 37 is disposed on the member that forms the sub-passage 26, and electricity is conducted in the heater 37 to heat the member of the sub-passage 26, thus removing substances adhering to the sub-passage 26.

Therefore, the second embodiment can obtain the same effect as in the first embodiment.

Third Embodiment

A third embodiment of the present invention will be explained below.

Figure 13:
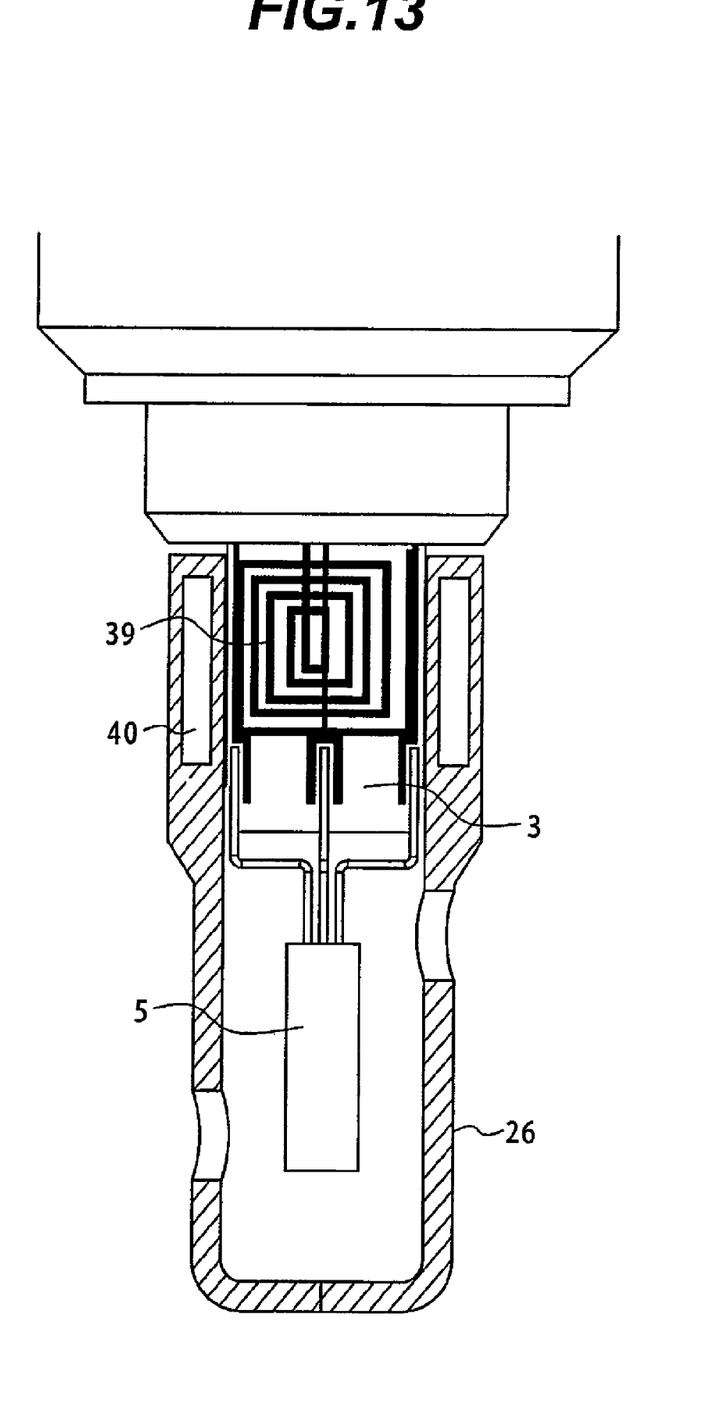
FIG. 13 is a diagram for assistance in explaining a third embodiment of the present invention.

FIG. 13 is a diagram for assistance in explaining the third embodiment of the present invention. The heater pattern 34 is formed on the surface of the cylindrical rod 3 in the first embodiment. In the third embodiment, however, an induction coil 39 is disposed instead of the heater pattern 34 formed on the surface of the cylindrical rod 3. Specifically, a heating element 40, which is heated by the electromagnetic induction of the induction coil 39, is disposed on the outer or inner surface of the member that forms the sub-passage 26. Other elements are the same as those of the first embodiment and therefore illustrations and detailed explanations are omitted. The induction coil 39 is connected to the electrode 4b formed on the cylindrical rod 3.

In this case, the member used to form the sub-passage 26 is made of preferably a magnetic substance, but not limited thereto. Further, it is effective to dispose the heating element 40 and select materials for the heating element 40 such that an induced-power coupling portion is different from a heat generating portion.

The third embodiment can obtain the same effect as in the first embodiment.

Fourth Embodiment

A fourth embodiment of the present invention will be explained below.

Figure 14:
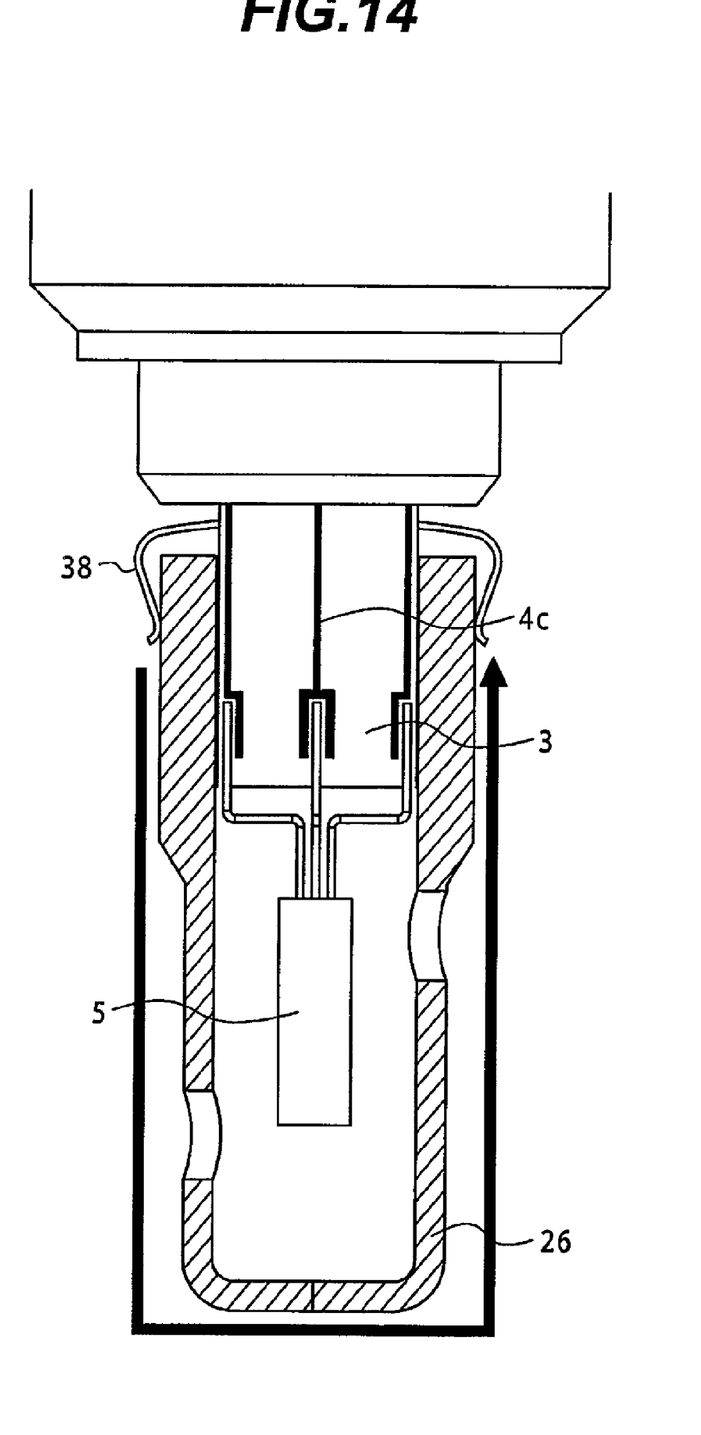
FIG. 14 is a diagram for assistance in explaining a fourth embodiment of the present invention.

FIG. 14 is a diagram for assistance in explaining the fourth embodiment of the present invention. In the fourth embodiment, the heater pattern 34 is not formed on the surface of the cylindrical rod 3; instead, as shown in FIG. 14, power lead wires 38 connected with the electrode 4c of the cylindrical rod 3 are connected to the member that forms the sub-passage 26. Other elements are the same as those of the first embodiment and therefore illustrations and detailed explanations are omitted.

The fourth embodiment is configured such that the member that forms the sub-passage 26 itself is a resistor, and the resistor is supplied with power through the power lead wires 38 to heat the member of the sub-passage 26.

The fourth embodiment can obtain the same effect as in the first embodiment.

Other Embodiments

As another embodiment, it is conceivable that a catalytic substance (such as platinum) is applied to the inner surface of the member that forms the sub-passage 26 in the above-mentioned first to fourth embodiments. When the catalytic substance is applied to the inner surface of the sub-passage 26, pollutional substances such as carbon can be oxidized and removed at temperature lower than the burning temperature, thus attaining power saving.

The catalytic substance may be applied not only to the inner surface of the sub-passage 26 but also to the outer surface thereof. When the catalytic substance is applied to the outer surface, pollutional substances adhering to the outer surface can be removed at a low temperature.

A timing at which the member that forms the sub-passage 26 is heated will be explained below.

Figure 15:
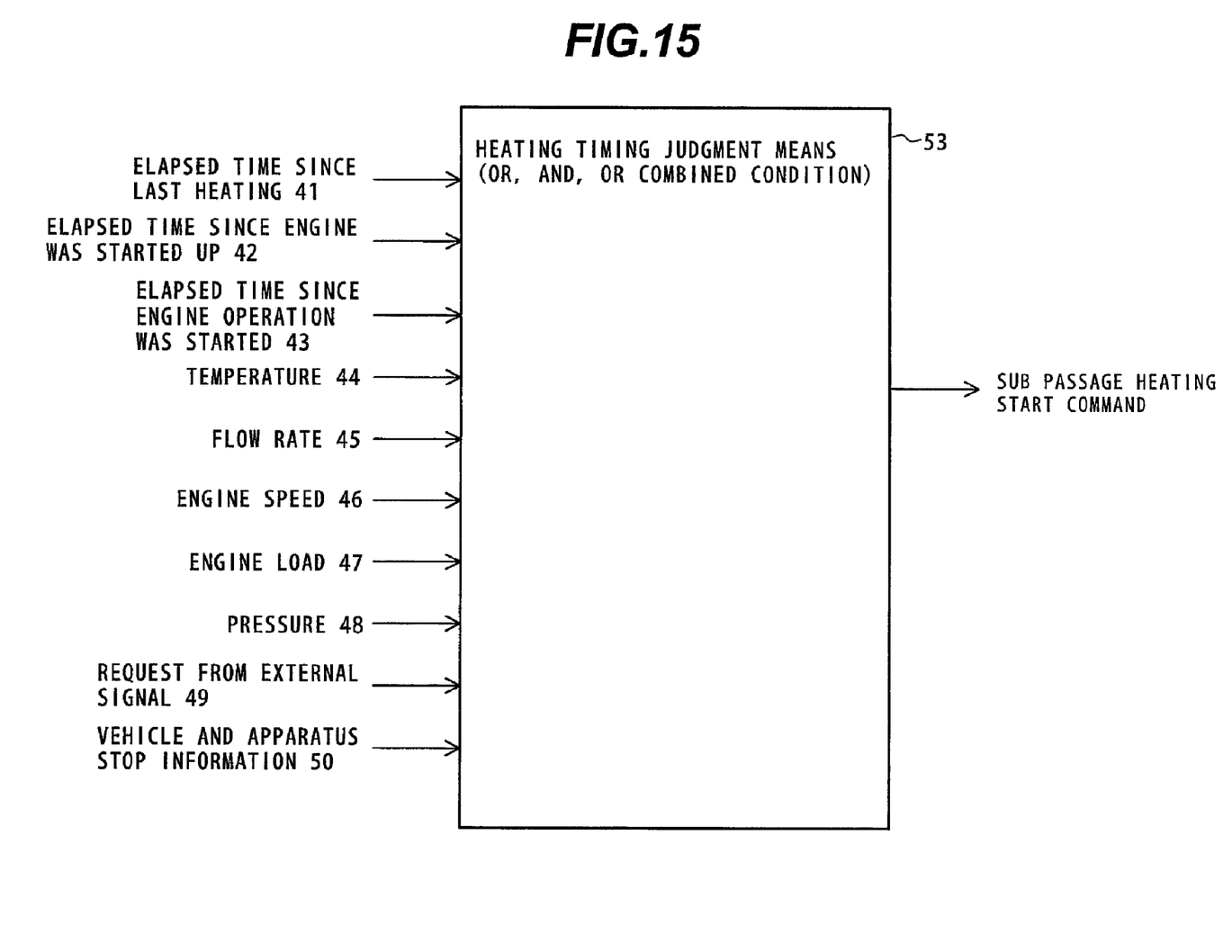
FIG. 15 is a diagram for assistance in explaining an example of conditions for determining a timing at which the sub-passage is heated.

FIG. 15 is a diagram for assistance in explaining an example of conditions determining a timing at which the sub-passage 26 is heated, by the controller 53. Referring to FIG. 15, the pollutional substance 33 gradually accumulates as the operating time progresses, and the temperature around the detecting element 5 rises during heating of the sub-passage 26, making measurement difficult. Therefore, it is rational to intermittently heat the sub-passage 26 depending on the situation.

For example, if the fluid flow rate measurement apparatus according to the present invention is used for measurement of the exhaust gas flow rate of an automobile, an elapsed time 41 since the last heating is set as a condition for heating timing judgment. In this case, the controller 53 determines a timing of heating and outputs a sub-passage heating start command (for example, to instruct the heating means to supply a heating current) to periodically heat the sub-passage 26, thus preventing the pollutional substance 33 from adhering to the sub-passage 26.

Further, if an elapsed time 42 since the internal combustion engine was started up or an elapsed time 43 since the operation of the internal combustion engine was started is set as a condition for heating timing judgment, the pollutional substance 33 can be removed before its accumulation progresses even in the case of long-term operation.

Likewise, temperature 44, flow rates 45 detected in the past and at present, an engine speed 46, an engine load 47, and a pressure 48 at each portion can also be used as information for grasping a degree of accumulation of the pollutional substance 33.

Further, a request 33 from an external signal can be added to the condition for heating timing judgment so that the pollutional substance 33 can be forcibly removed from an inspection apparatus during vehicle inspection. Further, if the sub-passage 26 is currently being heated by gas to be measured, energy and time required for heating can be reduced. Therefore, it is also effective to heat the sub-passage 26 immediately after a vehicle unit is stopped using stop information 50 of the vehicle unit.

Although a case where a cylindrical rod is used as a support of a sensing probe has been explained above as a typical case, a plate-like rod or a rod having a non-circular cross-sectional shape may be also applicable.

Although the present invention is applied to an apparatus for measuring the flow rate of air supplied to an internal combustion engine in the above-mentioned embodiments, the present invention is also applicable to flow rate measurement for other fluids. For example, the present invention is also applicable to a carbon dioxide exhaust gas flow rate measurement apparatus and a NOx exhaust gas flow rate measurement apparatus.

As explained above, the present invention enables long-term flow rate measurement with high accuracy even for fluid containing much exhaust gas and pollutional substances, and accordingly enables flow rate measurement at a portion where flow rate measurement could not conventionally be performed. This means that the present invention can be utilized in diverse industrial fields as a direct flow rate signal to be used for reducing exhaust gases from various power engines, combustion apparatuses, etc. In particular, if an exhaust gas from an automobile or stationary engine can be measured in terms of the mass flow rate, the amount of discharge of toxic substances can be easily obtained. Therefore, the present invention is very useful as a technique for environmental improvement and global warming measures.

What is claimed is:

1. A fluid flow rate measurement apparatus comprising:
a sub-passage disposed in a main passage where fluid to be measured flows, part of the fluid to be measured that flows in the main passage flowing into and flowing out of the sub-passage;
a detecting element disposed in the sub-passage to detect the flow rate of the fluid to be measured;
sub-passage heating means for heating the sub-passage; and
means for supporting the detecting element;
wherein the sub-passage heating means includes:
an induction coil disposed to the detecting element support means; and
a heating element disposed on the sub-passage forming member, the electromagnetic induction phenomenon of the induction coil allowing the heating element to generate heat.

2. A fluid flow rate measurement apparatus comprising:
a sub-passage disposed in a main passage where fluid to be measured flows, part of the fluid to be measured that flows in the main passage flowing into and flowing out of the sub-passage;
a detecting element disposed in the sub-passage to detect the flow rate of the fluid to be measured; and
sub-passage heating means for heating the sub-passage;
wherein the sub-passage heating means includes a sub-passage forming member having conductivity; and
wherein, when a current is supplied to the sub-passage forming member, the sub-passage forming member generates heat to heat the sub-passage.

3. A fluid flow rate measurement apparatus comprising:
a sub-passage disposed in a main passage where fluid to be measured flows, part of the fluid to be measured that flows in the main passage flowing into and flowing out of the sub-passage;
a detecting element disposed in the sub-passage to detect the flow rate of the fluid to be measured;
sub-passage heating means for heating the sub-passage; and
a controller for determining a timing at which the sub-passage starts to be heated based on an elapsed time since the sub-passage starts to be heated and information about an operation stop of the fluid flow rate measurement apparatus.

* * * * *